(12) United States Patent
Herron

(10) Patent No.: US 11,187,331 B2
(45) Date of Patent: Nov. 30, 2021

(54) VALVE ASSEMBLY

(71) Applicant: Lily Herron, Tucson, AZ (US)

(72) Inventor: Lily Herron, Tucson, AZ (US)

(*) Notice: Subject to any disclaimer, the term of this patent is extended or adjusted under 35 U.S.C. 154(b) by 0 days.

(21) Appl. No.: 16/154,978

(22) Filed: Oct. 9, 2018

(65) Prior Publication Data

US 2019/0113144 A1 Apr. 18, 2019

Related U.S. Application Data

(63) Continuation-in-part of application No. 15/784,005, filed on Oct. 13, 2017, now abandoned.

(51) Int. Cl.
| | |
|---|---|
| *F16K 31/60* | (2006.01) |
| *F16K 11/087* | (2006.01) |
| *E03C 1/04* | (2006.01) |
| *F16K 5/22* | (2006.01) |
| *F16K 5/20* | (2006.01) |
| *F16K 5/06* | (2006.01) |

(52) U.S. Cl.
CPC .............. *F16K 11/087* (2013.01); *E03C 1/04* (2013.01); *E03C 1/0412* (2013.01); *F16K 5/061* (2013.01); *F16K 5/201* (2013.01); *F16K 5/227* (2013.01); *F16K 31/602* (2013.01); *F16K 31/605* (2013.01)

(58) Field of Classification Search
CPC ....... F16K 31/605; F16K 5/201; E03C 1/0412
See application file for complete search history.

(56) References Cited

U.S. PATENT DOCUMENTS

| | | | | | |
|---|---|---|---|---|---|
| 6,155,297 | A | * | 12/2000 | MacAusland | ......... E03C 1/0404 137/625.41 |
| 6,643,862 | B2 | * | 11/2003 | Aitken | ................... E03C 1/0408 4/601 |
| 7,174,915 | B2 | * | 2/2007 | Fazekas | ..................... F16K 5/06 137/613 |
| 7,182,100 | B2 | * | 2/2007 | Pinette | .................. F16K 11/076 137/625.4 |
| 7,228,874 | B2 | * | 6/2007 | Bolderheij | ................ E03C 1/04 137/801 |
| 7,988,013 | B2 | * | 8/2011 | Lin | ........................ F16K 5/0647 220/714 |
| 8,453,669 | B2 | * | 6/2013 | Veros | ......................... E03C 1/04 137/315.13 |
| 8,572,772 | B2 | * | 11/2013 | Wolf | ....................... E03C 1/057 4/623 |
| 8,631,816 | B2 | * | 1/2014 | Hsu | ........................... E03C 1/04 137/315.12 |
| 9,033,000 | B2 | * | 5/2015 | Kacik | ................. F16K 11/0787 137/625.4 |

(Continued)

*Primary Examiner* — Reinaldo Sanchez-Medina
*Assistant Examiner* — Christopher D Ballman
(74) *Attorney, Agent, or Firm* — University of Arizona IP Clinic

(57) ABSTRACT

The present disclosure provides a valve enclosure and side handle faucet system comprising the valve enclosure. The valve enclosure comprises an inlet portion, an outlet portion and a valve cavity. The valve enclosure further comprises a ball valve and is mounted to the side of a spout such that fluid enters the valve cavity perpendicularly from a fluid inlet line and exits the cavity perpendicularly from an outlet such that the distance between the input and output flow to the cavity is minimized. The valve enclosure also comprises an interchangeable housing configured to surround the valve enclosure.

8 Claims, 14 Drawing Sheets

(56) References Cited

U.S. PATENT DOCUMENTS

| | | | | |
|---|---|---|---|---|
| 9,739,039 B2* | 8/2017 | Chang | ............... | E03C 1/04 |
| 10,385,555 B2* | 8/2019 | Braddock | ............... | E03C 1/055 |
| 2006/0266424 A1* | 11/2006 | Filtness | ............... | E03C 1/0403 |
| | | | | 137/625.4 |
| 2007/0246564 A1* | 10/2007 | Rodenbeck | ............... | E03C 1/057 |
| | | | | 239/67 |
| 2012/0018020 A1* | 1/2012 | Moore | ............... | E03C 1/0403 |
| | | | | 137/798 |
| 2012/0266992 A1* | 10/2012 | Zhou | ............... | E03C 1/06 |
| | | | | 137/861 |

* cited by examiner

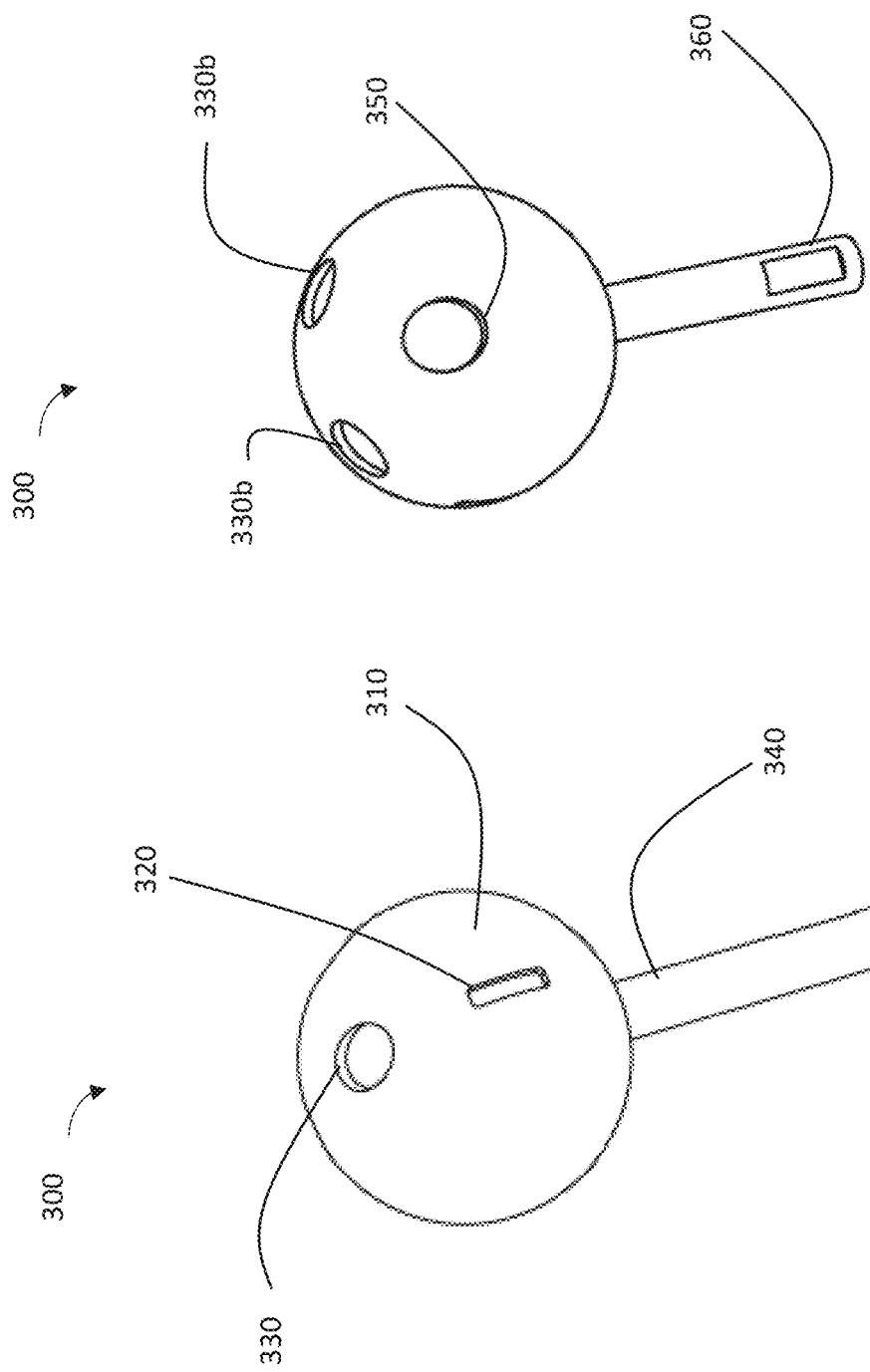

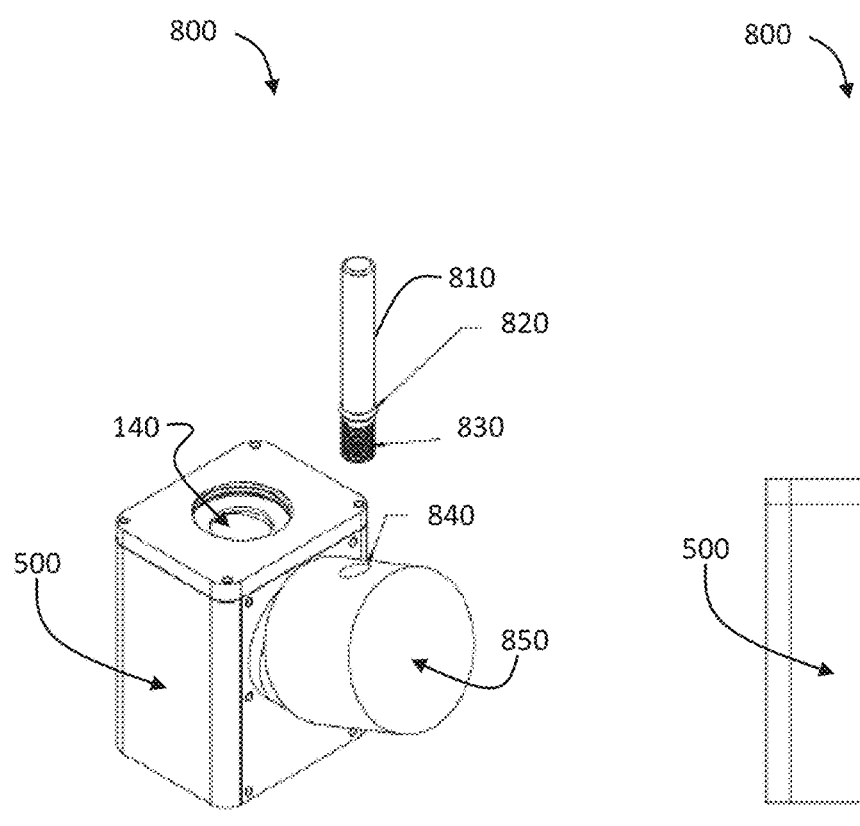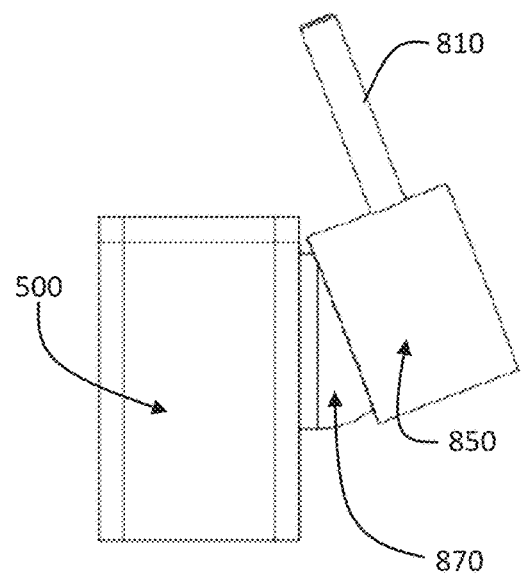
FIG 8A
FIG 8B

VALVE ASSEMBLY

PRIORITY CLAIM

This patent application is a continuation-in-part of U.S. patent application Ser. No. 15/784,005 titled "VALVE ENCLOSURE" and filed on Oct. 13, 2017, the entire contents of which are incorporated by reference herein.

FIELD OF INVENTION

The present invention relates to enclosures for fluid flow and their uses including in faucets.

BACKGROUND

Many faucets exist but there is a need for faucets that can be used by physically impaired, provide improved leak resistance, withstand poor water conditions, and can economically be repaired if damaged.

One type of faucet used by handicap persons is a faucet for controlling and combining the flow of both hot and cold water with the single handle located on the side of the faucet. Handles located at the side are more easily reachable and controllable than handles located at the top or back of the spout, especially for persons in wheelchairs, because they are lower and closer to the counter. Side handles are also easier to open and close because the distance between the seated user and the handle is shorter than traditional side or back handles.

Traditional faucets with handles located at a side have high leak risks, especially under poor water conditions. Current faucets with a single side handle configurations use ceramic-disc valves. Any scratch on the ceramic disc caused by sand, small rocks, or hard particles in the fluid supply may cause leaks. Existing valve assemblies cannot be disassembled to remove/replace the damaged parts. Thus, the entire faucet or the valve assembly must be replaced.

Some faucets use ball valves, instead of ceramic-disc valves, to mix hot and cold water or other fluids. Ball valves are only used in faucets with single handles at the top or back of the faucet and are not capable of side handle implementations. The footprint required for use as a side handle ball valve configuration (e.g. turning a traditional ball valve enclosure 90 degrees to become a side handle) is too large to fit within a confined space such as at a kitchen sink where a backsplash is in close proximity to the faucet. Likewise, other instruments such as soap dispensers, sensors or other mechanisms are co-located near the faucet thereby limiting the distance from which the ball valve may be located from the spout.

In addition current ball valve faucets use horizontal spouts, which limit clearance between the spout outlet and the sink, counter, or other surface. Limited clearance hinders the ability to perform tasks such as washing larger pots and pans, filling large containers or washing larger objects.

Embodiments of the present invention not only solve these problems but also improve the faucet system as a whole. Embodiments of the present invention propose a new and efficient manner to include ball valves in faucets with a single handle side installation including: reducing leak risk, providing better clearance between the spout and a surface, using a more wheelchair friendly configuration, and enables repair vs. replacement. Embodiments of the present invention could potentially be used in a variety of other fluid flow systems to solve space, leak or configuration issues.

Embodiments of the present invention also allow for the housing around the valve enclosure to be easily interchangeable, so that leaks will be easily apparent and more easily repaired.

SUMMARY

The present invention is directed to valve enclosures for fluids including single fluids and/or multiple fluids, which require mixing. The invention also includes the use of valve enclosures in faucets or other fluid dispensing systems, which solve the need for reducing leaks, providing better clearance between the spout and a surface, using a more wheelchair friendly configuration, and offering economic repair costs.

Embodiments of the present invention comprise a valve enclosure having a novel inlet and outlet configuration and a ball valve. The inlet to and outlet from the ball valve run substantially horizontal and are perpendicular to their respective supply inlet and spout outlet. The spout fully inserts into the valve enclosure and most of the body of the ball valve is contained within the valve enclosure, thus minimizing leaks.

Embodiments of the present invention use a vertical spout providing more clearance space between the sink and outlet end of the spout.

Embodiments of the present invention allow at least one fluid to enter the valve enclosure through a supply inlet where the supply inlet and the inlet to the ball valve are substantially perpendicular and thereby minimize the horizontal distance traveled by the fluid. Similarly, the outlet from the ball valve to the spout are substantially perpendicular and thereby minimize the horizontal distance traveled by the fluid before exiting the valve enclosure.

Embodiments of the present invention allow for a housing that is interchangeable. This solves the problem of not being able change the design of the faucet or other fluid system without uninstalling the entire faucet including the valve enclosure. The valve enclosure can remain installed while the rest of faucet or fluid dispensing system can be changed entirely.

Embodiments of the present invention can include at least two housing pieces that fit together and are held together using any suitable fastener or closing mechanism. The housing pieces fit around the valve enclosure of the faucet or other fluid dispenser so that the entire valve enclosure is enclosed by the interchangeable housing. The design of the valve enclosure allows for the interchangeable housing apertures to be fitted around the valve enclosure so that all of the aesthetic designs of the faucet can be easily changed by the user. Users may choose any design of the spout and change it by only inserting it into the valve enclosure and the housing.

BRIEF DESCRIPTION OF THE DRAWINGS

The embodiments of the invention will be better understood from a reading of the following description taken in conjunction with the drawings in which like reference designators are used to designate like elements, and in which:

FIG. 3A shows a perspective view of a ball component of a valve system;

FIG. 3B shows a rotated view of the ball component shown in FIG. 3A;

FIG. 8A illustrates a dis-assembled perspective view of a handle used to operate and control a valve system;

FIG. 8B illustrates a side view of an assembled valve system having a control mechanism;

DETAILED DESCRIPTION

Figure 1A:
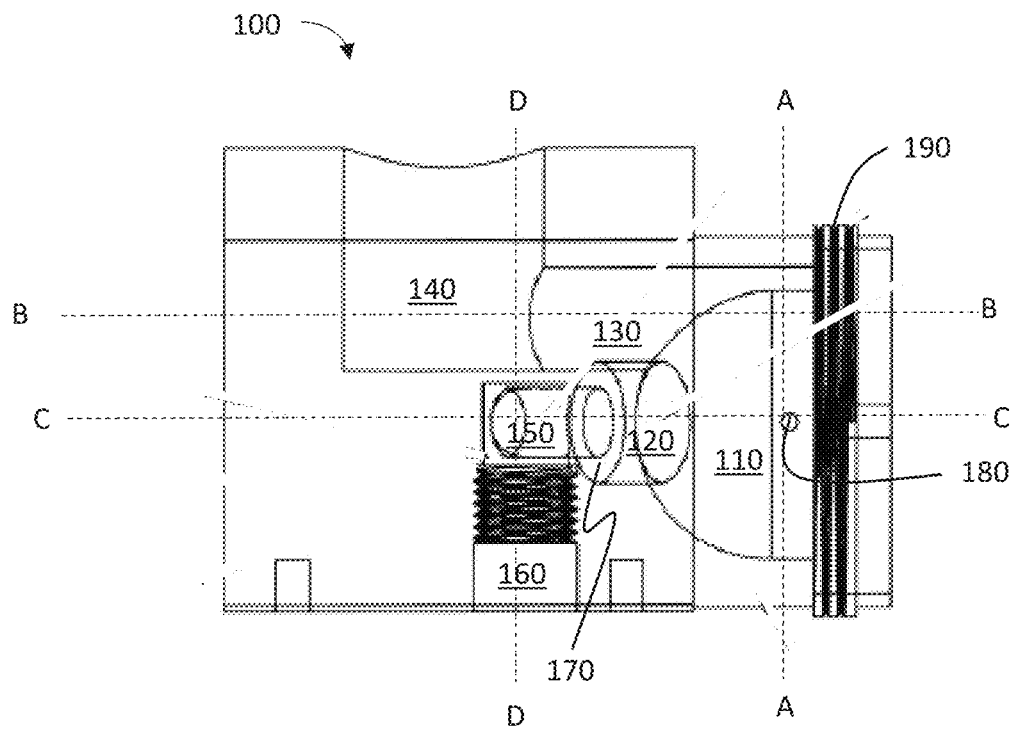
FIG. 1A illustrates a valve enclosure according to an embodiment of the invention.

While the invention is susceptible to embodiments in many different forms, there is shown in the drawings and herein described in detail, features, structures, or characteristics of my invention as demonstrated in various preferred embodiments. These embodiments are to be considered for illustrative purposes and as an exemplification of the principles of my invention and are not intended to limit the broad aspects of my invention to the specific embodiments illustrated herein. The features, structures, or characteristics of my/our invention as disclosed in any one preferred embodiment, for example, may be rearranged or combined with the features, structures or characteristics in any other embodiment. One skilled in the relevant art will also recognize that my invention may be practiced without one or more of the specific details, or with other methods, components, materials, and so forth. In other instances, well-known structures, materials, or operations are not shown or described in detail to avoid obscuring aspects of the invention.

FIG. 1A is an example valve enclosure 100, which includes: a valve cavity 110, a first inlet 120, a first outlet 130, a second outlet 140, a second inlet 150, a third inlet 160, a supporting surface 170, and a pin 180. Valve cavity 110 is in fluid communication with first inlet 120 and first outlet 130. First outlet 130 is in fluid communication with second outlet 140. First outlet 130 and second outlet 140 adjoin at an angle between 80° and 110° and preferable at 90° as shown in FIG. 1A.

First inlet 120 may be cylindrical in shape having a predetermined diameter and which adjoins concentrically to second inlet 150 having a predetermined diameter which is smaller than that of first inlet 120 to create supporting surface 170. Second inlet 150 is further coupled to third inlet 160 at an angle between 80° and 100° and preferably at 90° as shown in FIG. 1A.

The combined length of first inlet 120 and second inlet 150 are no more than 62.5 mm, no smaller than 7 mm, and preferably 16.5 mm. The length of first inlet 120 may be 1 mm and 10 mm and preferably 7 mm. This ensures the smallest possible footprint and maximum use for valve enclosure 100 and achieves the benefits of the invention.

In operation valve enclosure 100 receives a fluid (not shown) from third inlet 160 where the fluid flows in a vertical direction for example. The fluid then proceeds to second inlet 150 and flows in a second direction, for example horizontally towards first inlet 120. Fluid then proceeds to valve cavity 110. The fluid may further proceed through first outlet 130 in a horizontal manner, for example, and then transitions to a substantially vertical flow path as it passes through second outlet 140. It is important that third inlet 160 and second outlet 140 are substantially in parallel and in a plane as denoted by plane D-D, and first inlet 120, second inlet 150 and first outlet 130 are both substantially in parallel and minimal in length, preferably no more than 31 mm in order to accommodate valve enclosure 100 such that the area comprising valve enclosure 100 is minimized to the extent possible. Minimal area is desirable for valve enclosure 100 in order to enable operation within the confines of a confined operating environment, such as for example a faucet, fountain, beverage dispenser or other fluid dispenser having a small footprint.

Figure 5:
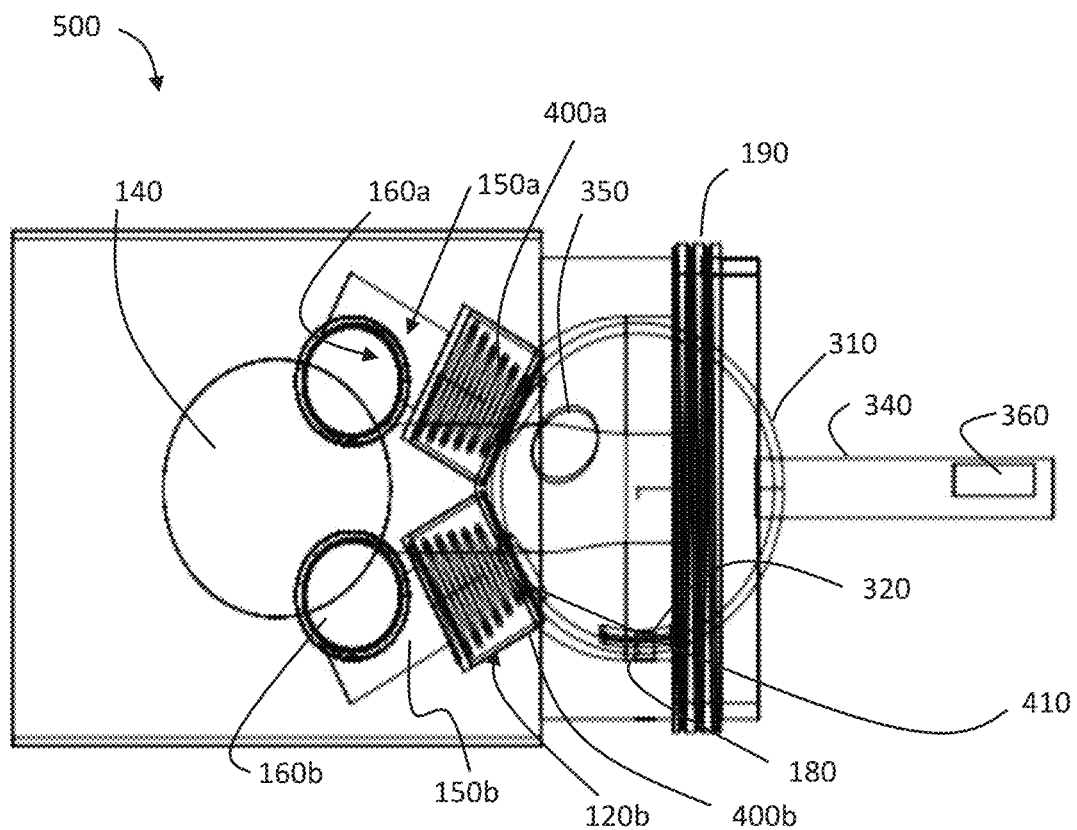
FIG. 5 illustrates a bottom view of an example valve system which includes: a valve enclosure, ball, spring and cup.

Furthermore, second outlet 140 being oriented in the substantially vertical position in operation enables a variety of fluid directional configurations while maximizing fluid pressure and minimizing leaks and is further described in FIG. 5.

Valve cavity 110 further comprises pin 180, which will be explained further in FIG. 5 and male bonnet threads 190 further described in FIG. 8B.

Valve enclosure 100 may comprise a material conducive to transporting fluids such as stainless steel including 303 Stainless Steel (SS), 304 SS, 317 SS, and other common varieties, ceramic or other lead free materials. Valve cavity 110, first inlet 120, first outlet 130, second outlet 140, second inlet 150 and third inlet 160 may be cut from valve enclosure 100 such as with a mill, lathe, or drill machine as recognized by those of ordinary skill in the art of manufacturing. Valve enclosure 100 may also be cast in either expendable or non-expendable molds. It is also potentially possible to manufacture the valve enclosure using 3-dimensional printing techniques.

Figure 1B:
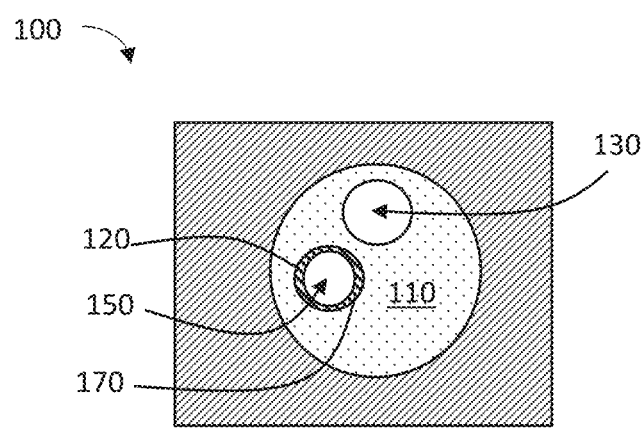
FIG. 1B illustrates a side view of FIG. 1A along the plane designated A-A.

FIG. 1B shows a side view of valve enclosure 100 as taken along line A-A shown in FIG. 1A. FIG. 1B shows valve cavity 110, first outlet 130, first inlet 120, second inlet 150 and surface 170. Valve cavity 110 is substantially spherical in shape to accommodate a ball (not shown) such that fluid may controllably flow from first inlet 120 into valve cavity 110 and then into first outlet 130. Fluid may be retained within valve cavity 110 in an off position described further in FIG. 5.

Figure 1C:
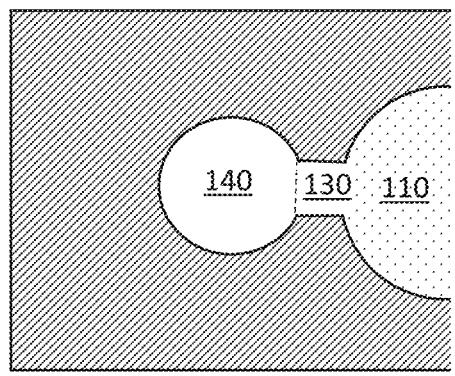
FIG. 1C illustrates a top view of the valve enclosure shown in FIG. 1A along the plane designated B-B.

FIG. 1C shows a top view of valve enclosure 100 as seen along plane B-B. Valve cavity 110 is in fluid communication with first outlet 130, where first outlet 130 has a minimal length before adjoining with second outlet 140 in order to minimize area requirements for valve enclosure 100. Second outlet 140 may be substantially cylindrical in nature or may be in other configurations (not shown) such as for example a rectangular or oval configuration to accommodate alternative fluid connections (not shown), as can be appreciated by one of ordinary skill in the art.

Valve cavity 110 may be open to a surface plane signified by plane A-A shown in FIG. 1A in order to accommodate a control mechanism (shown in FIGS. 4A and 4B) and enable replacement of multiple control components such as cups, springs or balls for example (shown in FIGS. 4A and 4B), which will be further described in FIG. 5.

In operation, a fluid may flow from valve cavity 110 into first outlet 130 and may then proceed to second outlet 140, which is substantially perpendicular to first outlet 130 and a minimal distance from valve cavity 110.

Figure 2A:
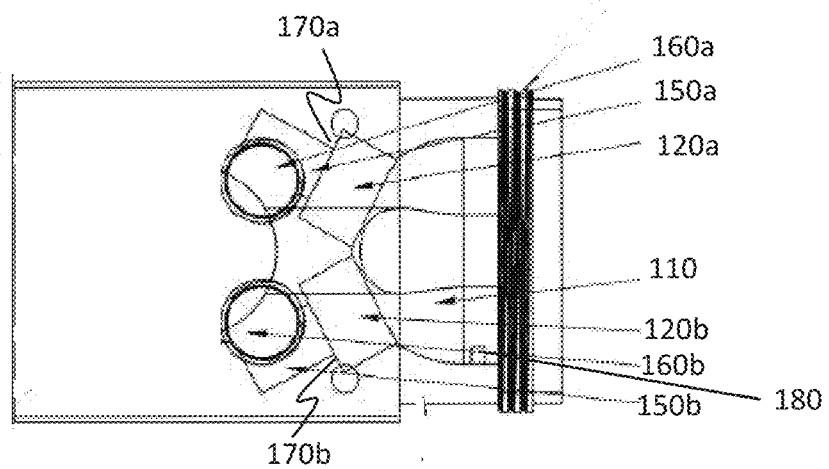
FIG. 2A is a bottom view (represented by plane C-C of FIG. 1A) of a second embodiment of a valve enclosure, which includes a second inlet.

FIG. 2A shows a bottom view of a second embodiment of a valve enclosure 200. Valve enclosure 200 comprises inlets for a first and second fluid supply, specifically shown as a first inlet 120a and a first inlet 120b in fluid communication with a second inlet 150a and a second inlet 150b respectively. Second inlet 150a is further coupled to a third inlet 160a. Second inlet 150b is further coupled to a third inlet 160b. First inlet 120a and first inlet 120b terminate at valve cavity 110.

A supporting surface 170a is formed from first inlet 120a adjoining second inlet 150a where second inlet 150a has a predetermined diameter which is smaller than a predetermined diameter of first inlet 120a.

Third inlet 160a adjoins to and is substantially perpendicular to second inlet 150a. Likewise third inlet 160b adjoins to and is substantially perpendicular to second inlet 150b. The length of second inlets 160a and 160b and first inlets 120a and 120b are minimized to accommodate a smaller footprint of valve enclosure 200. However, if operational space permits the length of second inlets 160a and 160b and first inlets 120a and 120b may be longer.

In operation, valve enclosure 200 receives a first and a second fluid via third inlet valves 120a and 120b respectively. The first and second fluid may be, for example hot and cold water such as in a standard faucet, a sweetener, or in another example a fluid concentrate and diluent such as water as in a beverage dispenser. Other examples of mixing fluids are conceivable without deviating from the spirit and scope of the invention.

The first and second fluids further mix in valve cavity 110 and then exit via first outlet 130. The ratio of first and second fluids entering valve cavity 110 are controlled by a control mechanism (shown in FIGS. 3A and 3B) and further explained in FIG. 5.

Figure 2B:
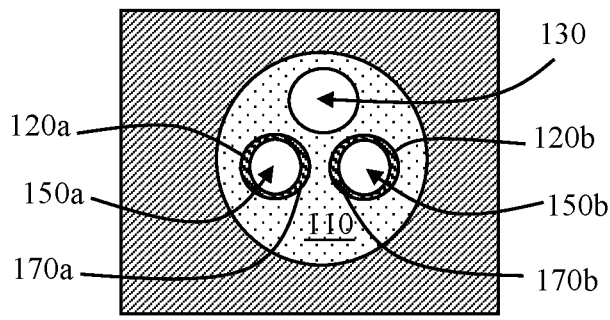
FIG. 2B is a representational side view of the valve enclosure shown in FIG. 2A.
Figure 2C:
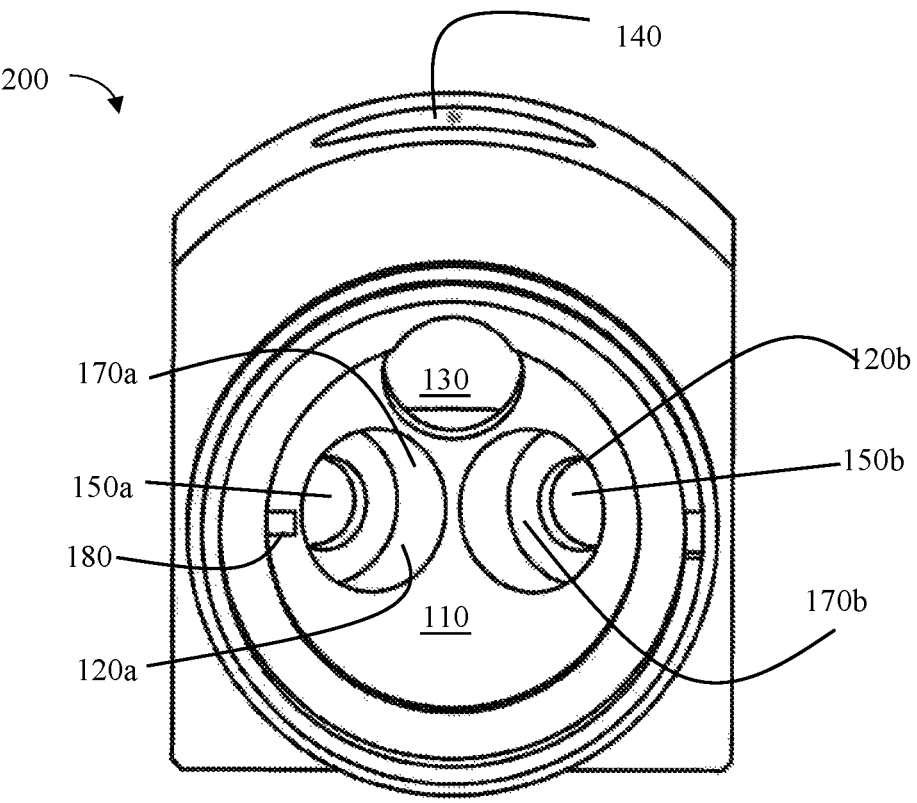
FIG. 2C shows a 3-dimensional perspective view of FIG. 2B.

FIG. 2C is a perspective view of FIG. 2B which depicts first inlets 120a and 120b respectively, second inlets 150a and 150b respectively and supporting surface 170a and 170b. Supporting surface 170a is created by adjoining first inlet 120a and second inlet 150a concentrically in series. Likewise supporting surface 170b is created by adjoining first inlet 120b and second inlet 150b concentrically and in series. First inlets 120a and 120b terminate at a surface of valve cavity 110. Likewise first outlet 130 commences at a surface of valve cavity 110. The surface of valve cavity 110 is substantially spherical to accommodate a ball component (not shown) and further described in FIG. 3A and FIG. 3B.

FIG. 2C also shows the location of second outlet 140 with respect to valve enclosure 200. Second outlet 140 is substantially perpendicular to first outlet 130 and is located above third inlets 160a and 160b respectively when valve enclosure 200 is in operation. [0049] FIG. 2C further comprises pin 180, which may be located anywhere within the surface of valve cavity 110, but preferably in the location as shown in FIG. 2C.

FIG. 3A is ball 300a comprising an inlet orifice 330, a slot 320, a surface 310 and a stem 340. In accordance with the first embodiment of the invention shown in FIG. 1A, the operation of ball 300 enables inlet orifice 330 to align with first inlet 120 to allow a fluid to flow into ball 300. Ball 300 is controlled via stem 340. Movement to stem 340 causes ball 310 to rotate within valve cavity 110. Slot 320 aligns with pin 180 to confine the amount of rotation within valve cavity 110 and ensure ease of alignment with first inlet 120.

Ball 300 may be hollow so as to allow fluid to flow into ball 300 from first inlet 120. The amount of fluid flowing into ball 300 is controlled by the degree of alignment between first inlet orifice 330 and first inlet 120 when ball 300 is rotated by stem 340. When first inlet orifice 330 is fully aligned with first inlet 120 the flow is at maximum flow rate. Likewise when first inlet orifice 330 is partially aligned the flow is restricted according to proportion of alignment, as can be appreciated by one skilled in the art of flow control valves.

FIG. 3B illustrates ball 300b having a first inlet orifice 330a second inlet orifice 330b, an outlet orifice 350 and a notch 360. In operation a first fluid flows from first inlet 120a into ball 300b when aligned with first inlet orifice 330a and a second fluid flows from first inlet 120b into ball 300b when aligned with second inlet orifice 330b. Alignment of first inlet orifice 330a, second inlet orifice 330b with first inlet 120a and second inlet 120b respectively and further alignment between outlet orifice 350 and first outlet 130 is controlled by rotating ball 300b via a handle (described and shown in FIGS. 8A and 8B) attached to stem 340 through notch 360.

Ball 300a and/or ball 300b may be comprised of stainless steel, ceramic, or other suitable material as can be appreciated by one of ordinary skill in the art. Ball 300b may be, for example, a ball mixing valve model number RP70 manufactured by Delta Faucet Company.

Figure 4:
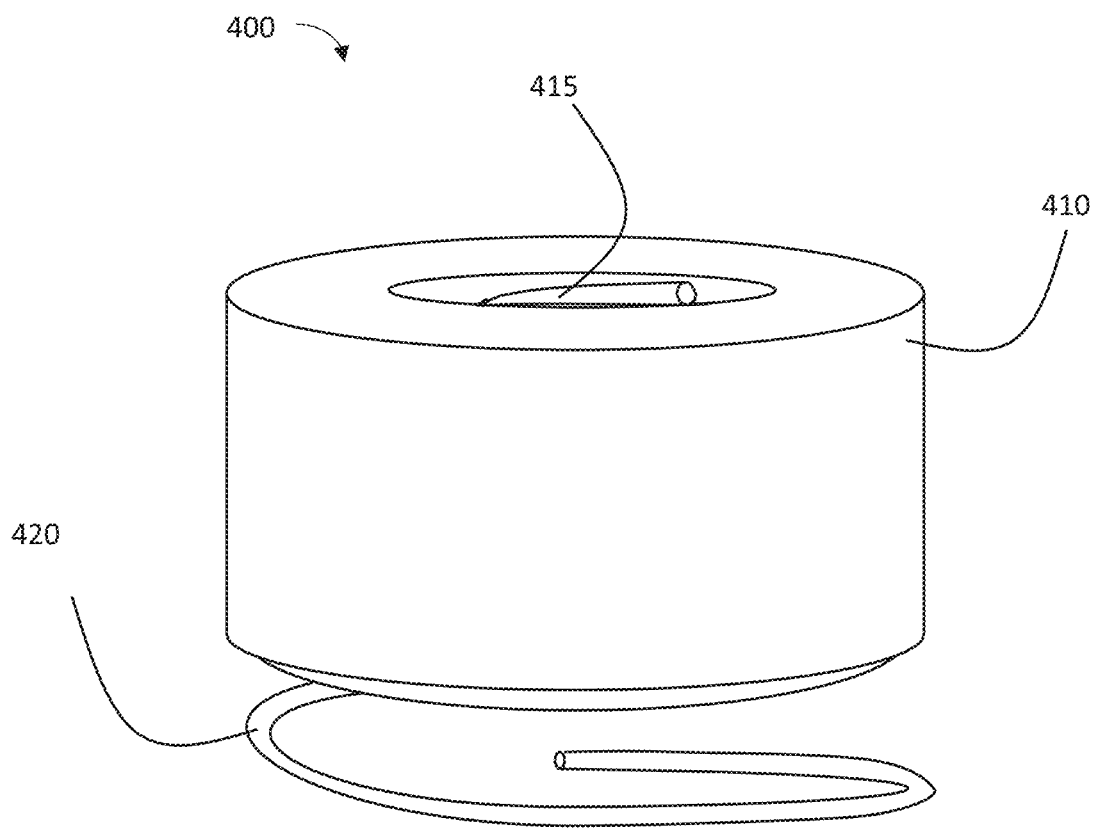
FIG. 4 shows a perspective view of a spring and a cup component of a valve system.

FIG. 4 shows a cup and spring component 400 having a cup 410, which includes an orifice 415, and a spring 420. Spring 420 rests within cup 410 such that fluid flows from the base of spring 420 through orifice 415. Spring component 400 may be replaced when spring 420 loses compression and/or cup 410 becomes cracked or otherwise inoperable. Spring component 400 is inexpensive and easily replaced with minimal technical effort. Spring component 400 is further shown in FIG. 5 and FIG. 7 to aid in further explanation.

FIG. 5 illustrates a top mechanical view of the second embodiment of the invention which includes at least 2 incoming fluids. Valve system 500 includes 2 spring components 400a and 400b, each located within first and second inlets 120a and 120b respectively. Spring 420a rests against supporting surface 170a and provides force on cup 410a, which in turn applies force to ball surface 310, thus creating a consistent seal between cup 410a and ball surface 310. A silicone lubricant as used in the industry may be applied to cup 410a to enable ease of rotation of ball 300 while maintaining a seal. Similarly component 400b provides a seal between cup 410b and ball surface 310.

Figure 7:
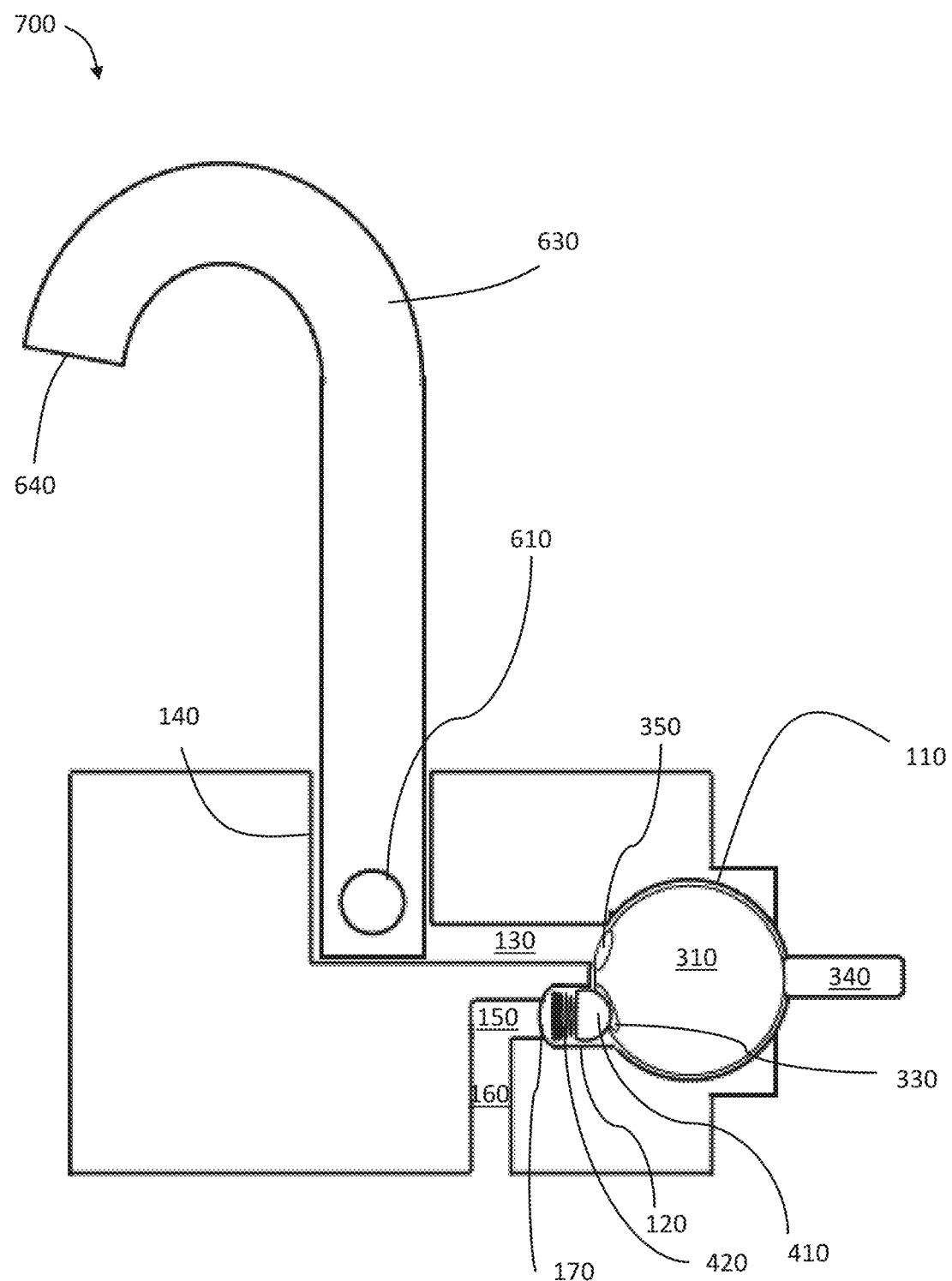
FIG. 7 is a faucet system, which includes the example valve system shown in FIG. 1A, and a spout.

Pin 180 slideably engages slot 320 to ensure proper alignment between first inlet 120a and inlet orifice 330a as well as first inlet 120b and inlet orifice 330b and finally outlet orifice 350 with first outlet 130 (as shown in FIG. 7). The position of ball 300 is controlled by stem 340. In a first position (off position) outlet orifice 350 does not align with first outlet 130 and thus no fluid flows from ball 300 to first outlet 130. In a second position (on position) outlet orifice 350 aligns with first outlet 130 and fluid may flow from ball 300 and into first outlet 130.

In order for a first and second fluid to mix the position of ball 300 must cause first inlet 120a to at least partially align with inlet orifice 330a to allow a first fluid to flow into ball 300 and cause second inlet 120b to at least partially align with inlet orifice 330b to allow a second fluid to flow into ball 300. The first and second fluids mix within ball 300 and subsequently flow out of ball 300 through outlet orifice 350 into first outlet 130 and further proceed to second outlet 140. The positioning of first inlets 120a and 120b with respect to second inlets 160a and 160b respectively in a perpendicular manner enable proper alignment for a side handle ball mixing valve configuration using a standard mixing ball, such as ball 300, in a small footprint not otherwise achievable using standard ball mixing valve configuration.

Figure 6A:
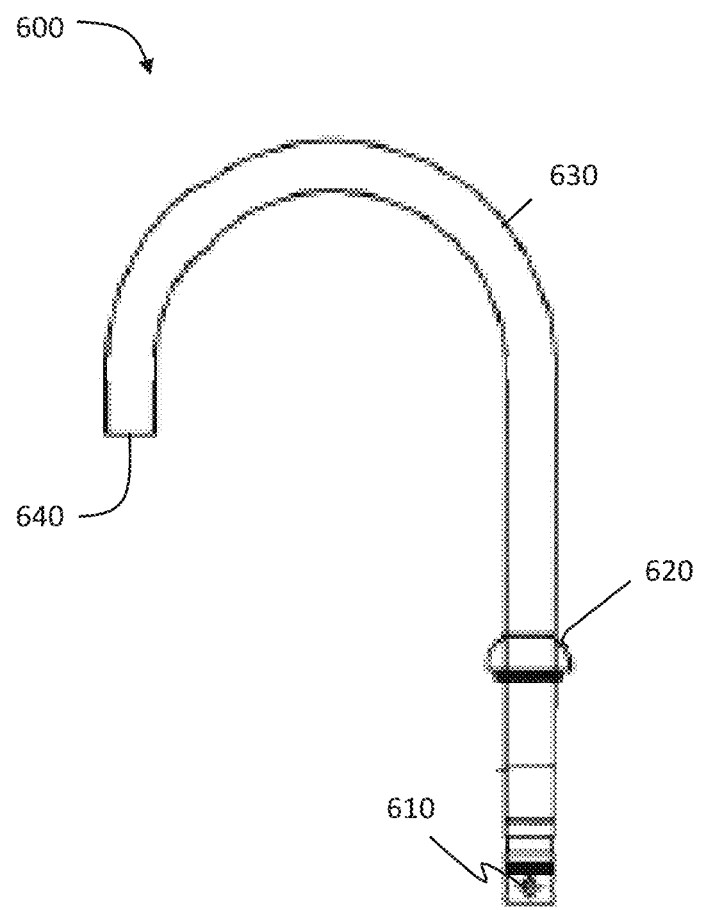
FIG. 6A illustrates a faucet system in a dis-assembled format.

FIG. 6A illustrates a spout system 600, which comprises a spout 630, at least one spout inlet 610, a spout outlet 640 and an escutcheon 620. In operation a fluid flows into spout inlet 610 through spout 630. Spout 630 is open at the end opposite spout inlet 610 to allow fluid to exit spout 630 through spout outlet 640.

Spout 630 may include any configuration and shape conducive to the flow of fluid and desired flow path. A high-profile spout 630 as shown in FIG. 6A enables a higher clearance than traditional shorter spout configurations and is conducive to activities such as filling larger containers with fluid and allowing fluid to flow over larger objects from a desirable overhead position such as for example washing larger objects, pets, clothing, dishes or cookware.

Figure 6B:
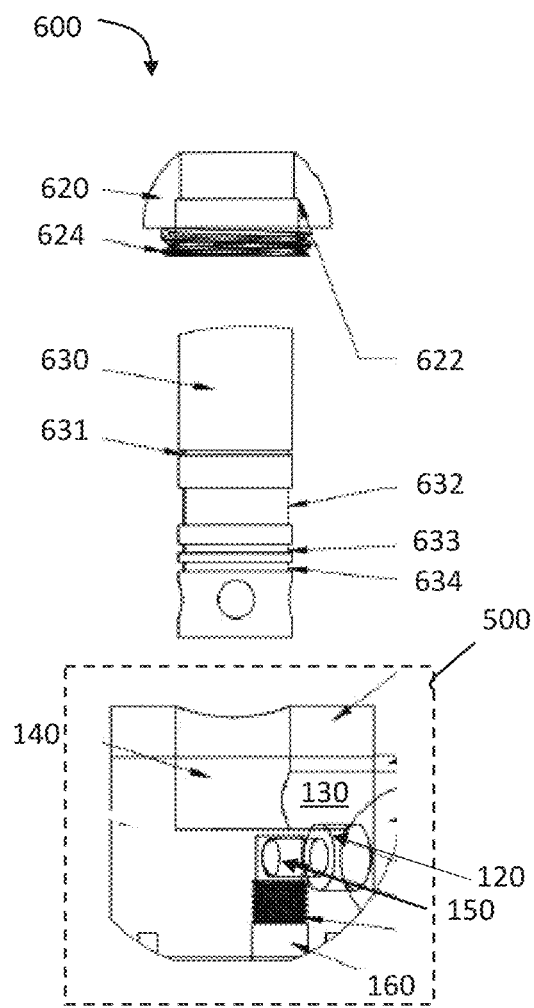
FIG. 6B illustrates an exploded view of the components of the faucet system.

FIG. 6B shows a detailed view of a portion of spout system 600 and valve enclosure 100. Spout system 600 further includes an escutcheon orifice 662 passing through escutcheon 620, escutcheon threads 624 to secure spout 630 to second outlet 140 of valve enclosure 100, a retaining ring 631, a friction ring 632, a first o-ring 633 and a second o-ring 634 to ensure fluid flows into spout inlet 610 from second outlet 140.

FIG. 7 illustrates a faucet system 700 in accordance with the first embodiment of the invention having a single fluid input and single fluid output. Faucet system 700 illustrates cup 410, which is compressed by spring 420, applying force to ball surface 310 as inlet orifice 330 aligns with first inlet 120. Spring 420 further rests on supporting surface 170 to avoid entering second inlet 150. Fluid enters third inlet 160 and passes into second inlet 150, which is adjoined at a relatively perpendicular angle. In an on position fluid flows into ball 300 and exits via outlet orifice 350 into first outlet 130 proceeding to second outlet 140, which is substantially perpendicular to first outlet 130 and is further in a substantially vertical position when installed at a sink or other beverage dispenser for example. Fluid then proceeds to spout 630 via spout inlet 610 and out through spout outlet 640.

FIG. 8A illustrates a perspective view of a valve control system 800 comprising valve enclosure 500, a handle 810, an o-ring 820, handle threads 830, an attachment orifice 840 and a controller 850, where handle 810 is attached to controller 850 via handle threads 830 into attachment orifice 840.

FIG. 8B illustrates a side view of valve control system 800 wherein a bonnet 870 interfaces with both controller 850 and valve enclosure 500 such that ball 300 is rotatably secured within valve cavity 110 and stem 340 protrudes into controller 850 such that handle 810 interfaces with stem 340 via notch 360.

Although valve enclosure 500 is illustrated in valve control system 800, it should be recognized that valve enclosure 500 may be replaced with valve enclosure 100 such that control system 800 controls the single fluid embodiment described herein.

Figure 9:
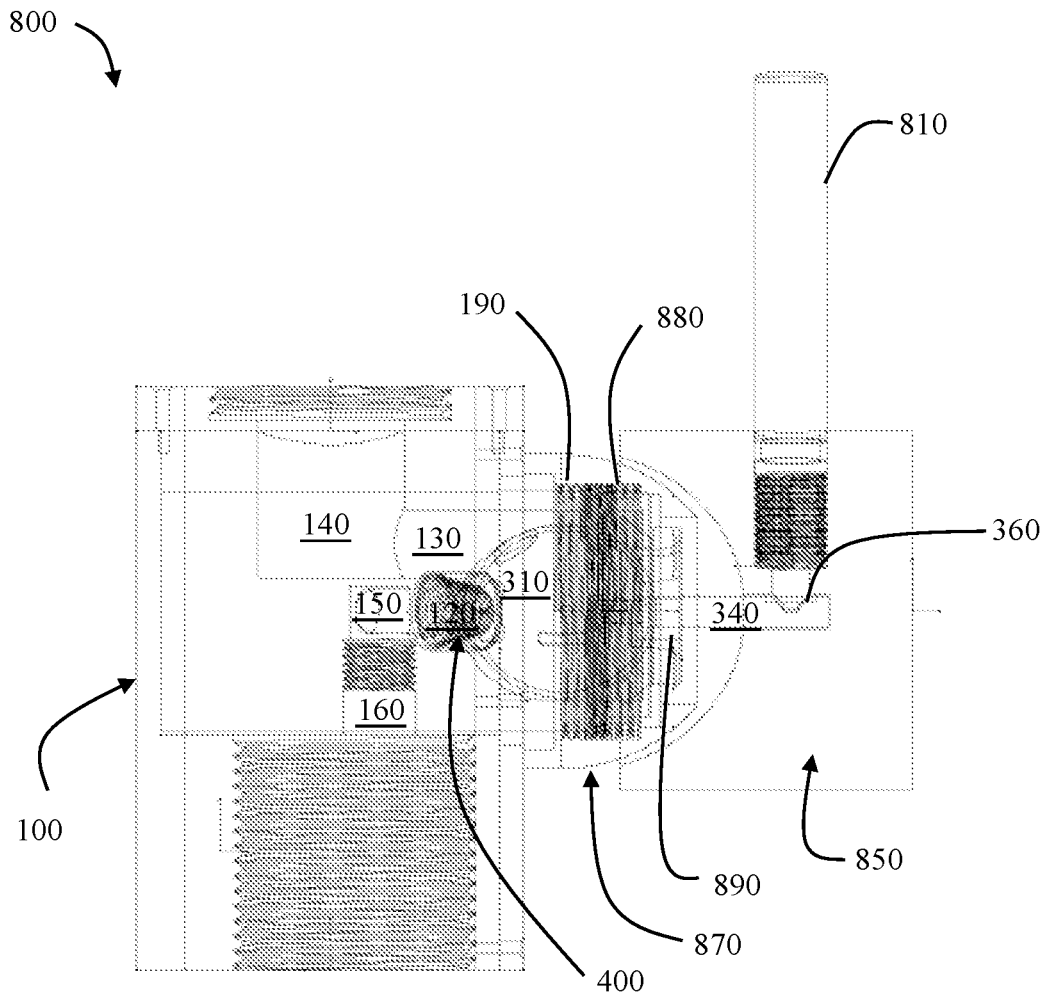
FIG. 9 shows a mechanical view of a valve system and control mechanism.

FIG. 9 illustrates a mechanical view of control system 800, which comprises valve enclosure 100 wherein a fluid enters third inlet 160 in a substantially vertical position then proceeds to a substantially horizontal flow as it enters second inlet 150, passes through spring component 400 and into ball 300 when handle 810 moves controller 850 to an on position such that first inlet 120 aligns with inlet orifice 330 of ball 300 and at the same time outlet orifice 350 aligns with first outlet 130. The fluid flow is directly proportional to the amount of alignment of first inlet 120 with inlet orifice 330 and or the amount of alignment of first outlet 130 with outlet orifice 350. The fluid proceeds from first outlet 130 to second outlet 140 and exits valve enclosure 100 in a substantially vertical position.

Bonnet 870 further comprises female bonnet threads 880 which attach to male bonnet threads 190 such that controller 850 securely attaches to valve enclosure 100 to secure ball 300 within valve cavity 110 where slot 320 slideably engages with pin 180 and provides equal force against spring component 400 to ensure a seal between ball surface 310 and cup 410. A bonnet gasket 890 may also be located within bonnet 870 to further assist in preventing leaks into the controller 850 around stem 340.

As can be appreciated by one of ordinary skill in the art, the vertical position of second outlet 140 and spout 630 ensures that any fluid remaining in second outlet 140 when control system 800 is in the off position is retained within second outlet 140 and cannot leak into any other section of valve enclosure 100. Similarly, no leaks occur in the second embodiment configuration using valve enclosure 500.

Figure 10:
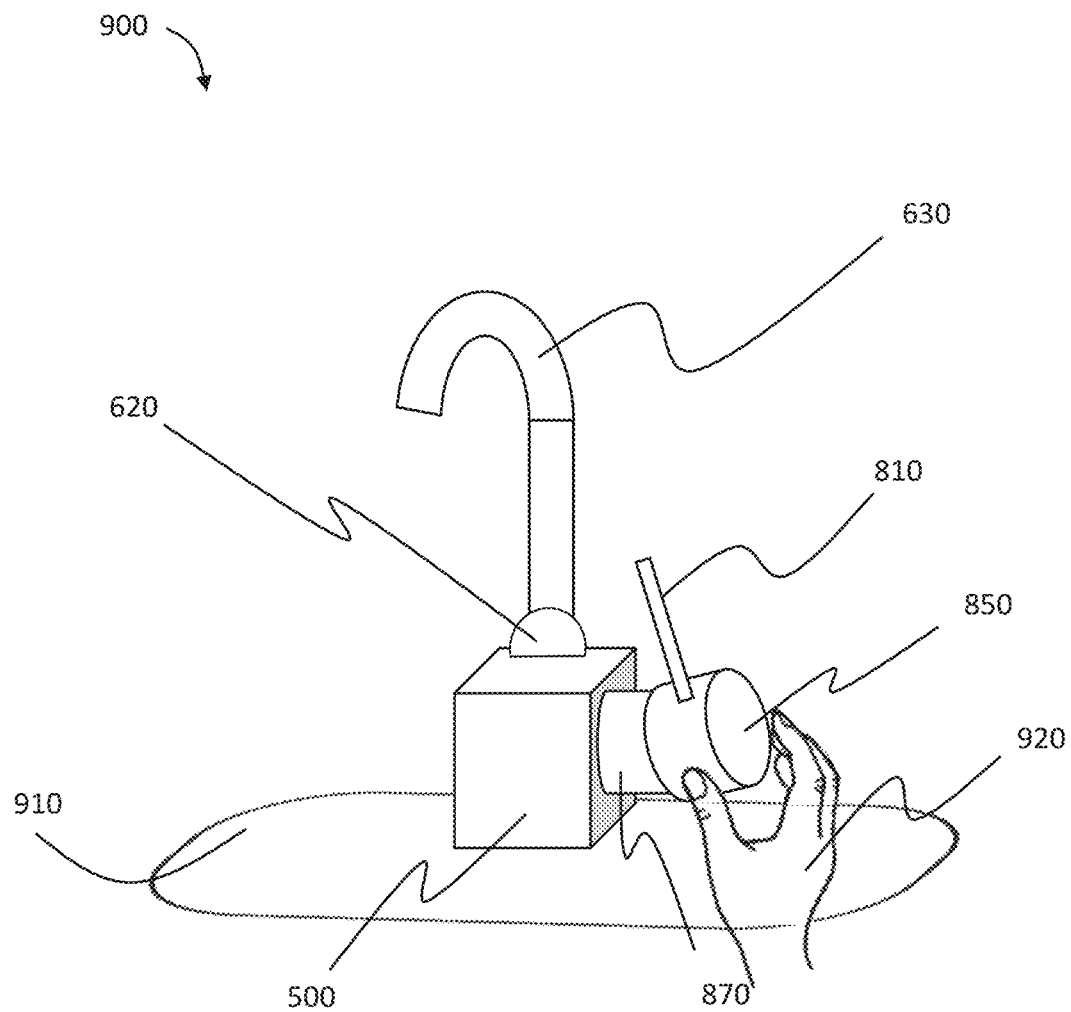
FIG. 10 represents an article of manufacture including a faucet system and top plate, and a means of controlling the faucet system.

FIG. 10 illustrates a faucet system 900 in a use case where a user 920 manipulates controller 850 to activate valve enclosure 500. FIG. 10 shows faucet system 900 in the off position. Spout 630 attaches to valve enclosure 500 via escutcheon 620. Valve enclosure 500 is further attached to a plate 910, which may be secured to a structure, for example such as a sink or other beverage dispenser.

Valve enclosure 500 shown in FIG. 10 may be substituted for valve enclosure 100 to enable the first embodiment without departing from the spirit and scope of the invention.

If necessary, bonnet 870 may be removed in order to access valve cavity 110 and inspect or remove ball 300. Additionally, by removing ball 300, one may inspect and/or replace spring component 400. Furthermore, spout 630 may be removed from valve enclosure 100 or valve enclosure 500 for inspection and/or replacement. Thus valve enclosure 100 or valve enclosure 500 enable one to replace system parts without purchasing a new faucet system 900.

Figure 11:
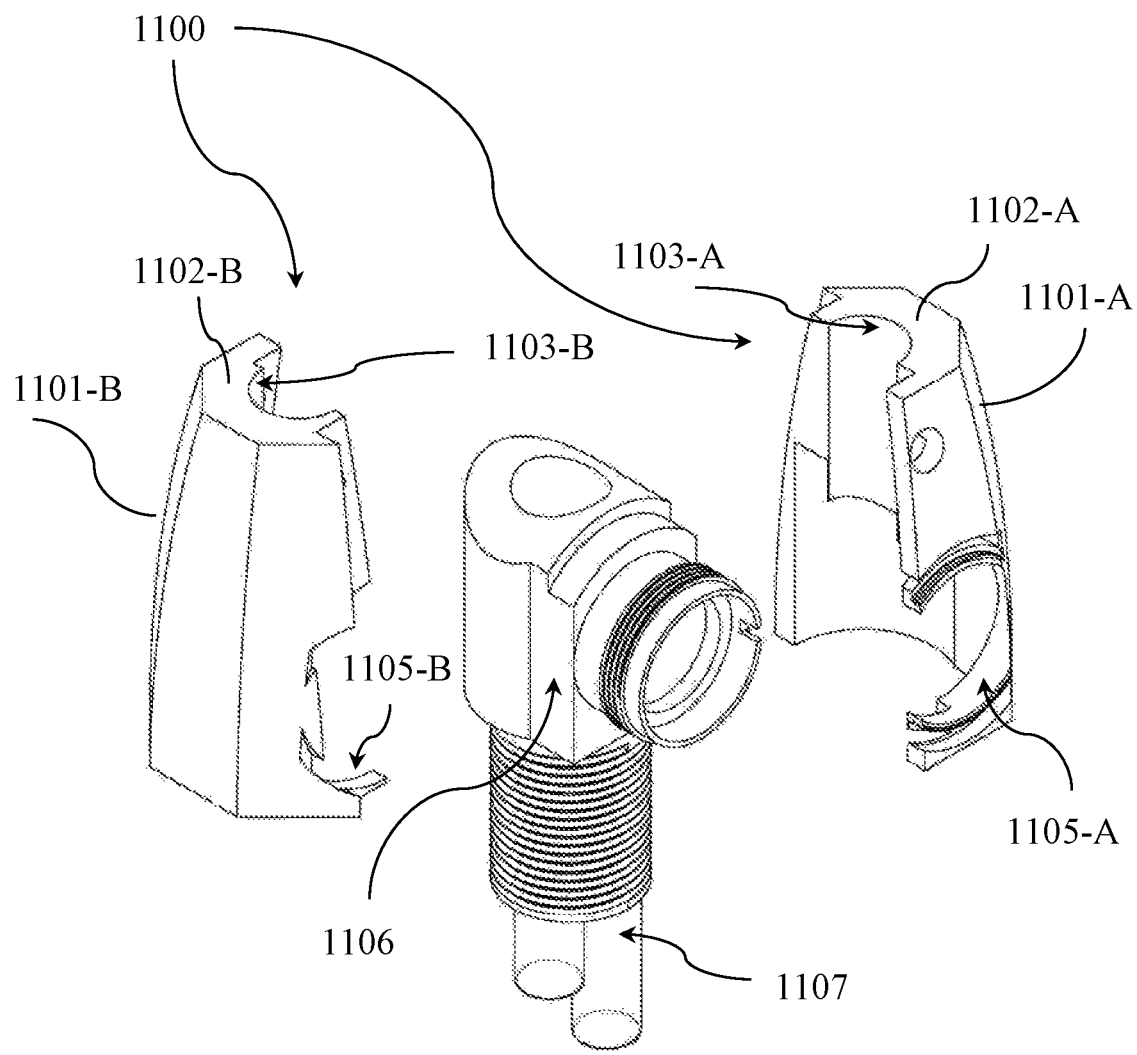
FIG. 11 shows a front perspective view of the valve assembly.
Figure 12:
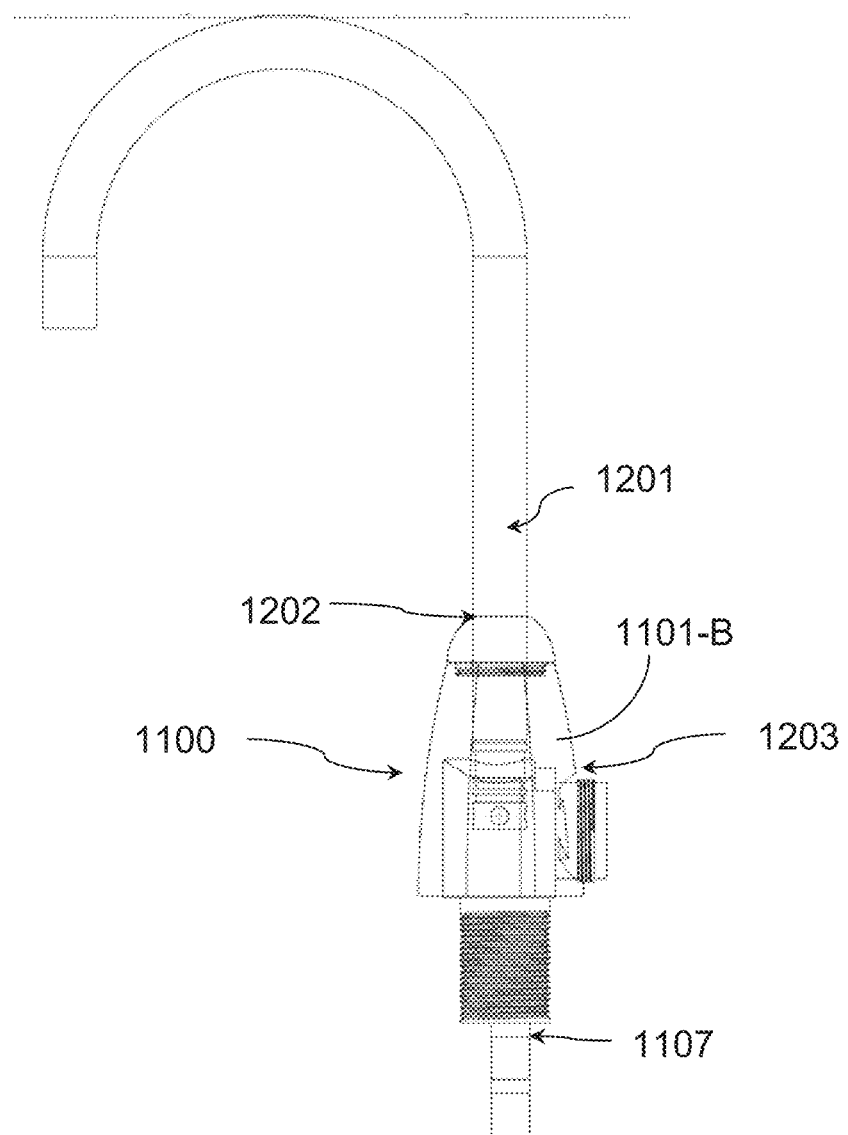
FIG. 12 shows a side view of the housing surrounding the spout, valve enclosure, and water supply.

In another embodiment showing in FIGS. 11-12, a valve assembly includes a valve enclosure and an interchangeable housing 1100 surrounding the valve enclosure. The interchangeable housing 1100 includes a first housing side 1101-A having a first top 1102-A. The first top 1102-A defines a first top opening 1103-A configured to partially surround a spout attachable to a valve enclosure 1106. The first housing side 1101-A further defines a first recessed portion 1105-A configured to partially surround around half of an opening of valve enclosure 1106. A second housing side 1101-B has a second top 1102-B. The second top 1102-B defines a second top opening 1103-B configured to partially surround a spout attachable to valve enclosure 1106. The second housing side 1101-B defines a second recessed portion 1105-B configured to partially surround around the other half of an opening of valve enclosure 1106. In an embodiment, when the first housing side 1101-A and the second housing side 1102-B are attached around valve enclosure 1106 it has a hollow internal configuration that mirrors the external shape of valve enclosure 1106 so as to fit tightly around valve enclosure 1106.

FIG. 12 shows when the first housing side 1101-A and the second housing side 1101-B are attached. When first housing side 1101-A is connected to the second housing side 1101-B an enclosed first top hole 1202 is formed. The spout 1201 is easily inserted and removed through the first top hole 1202.

When the first housing side 1101-A is connected to the second housing side 1101-B, an enclosed second side hole is formed 1203. The valve enclosure 1106 may connect to a handle (not shown) through the second side hole 1203, for example, that controls the fluid flow through the valve enclosure 1106.

FIGS. 11-12 also shows the valve enclosure 1106 and two input fluid streams 1107. Water or some other combination of fluids may flow into the two input fluid streams 1107. The two fluids mix into one stream of fluid inside the valve enclosure 1106. The singe fluid stream exists the faucet through the spout 1201.

The valve enclosure 1106 allows for the spout 1201 to be screwed into it so that the interchangeable housing 1100 can be fitted around it in a manner in which the housing 1100 can be interchangeable. The interchangeable housing 1100 can be installed and uninstalled onto to the faucet without installing and uninstalling the entire fixture.

Embodiments of the present invention propose a new type of interchangeable housing that covers an entire valve enclosure, which may sit above a counter. Because of this, the entire design of the faucet including the handle, housing, and/or spout, can be interchanged without uninstalling the entire fixture. This makes it easier to change the design without having to work underneath the counter and without having to change the valve enclosure and supporting water lines of the faucet. This makes remodeling and design changes of a faucet or fluid dispenser more efficient and less expensive, as well making it easier for the average homeowner to customize. In an embodiment, a bonnet that holds the valve within the valve enclosure may allow for the interchangeable housing to be easily interchanged in the manner disclosed in this application.

While the preferred embodiments of the present invention have been illustrated in detail, it should be apparent that modifications and adaptations to those embodiments may occur to one skilled in the art without departing from the scope of the present invention.

The invention claimed is:

1. A side-mounted ball valve assembly on a faucet or dispenser,
comprising:
a valve enclosure comprising at least one outlet having a first outlet portion substantially perpendicular to a second outlet portion, a first inlet having a first inlet portion substantially perpendicular to a second inlet portion, a second inlet having a third inlet portion substantially perpendicular to a fourth inlet portion;
an initial flow path axis substantially perpendicular to the first inlet portion; and
a valve cavity coupled to a ball valve mounted on a side perpendicular to the initial flow path axis in fluid communication with the at least one outlet, the first inlet and the second inlet; and
an interchangeable housing configured to surround the valve enclosure.

2. The valve assembly of claim 1, wherein the interchangeable housing entirely
covers the valve enclosure except for openings of the valve enclosure.

3. The valve assembly of claim 1, wherein the interchangeable housing comprises one or more sides.

4. The valve assembly of claim 1, wherein the interchangeable housing comprises a first housing side defining a first partial top opening and a second housing side defining a second partial top opening wherein the first partial top opening is attached to the second partial top opening forming an enclosed top hole.

5. The valve assembly of claim 4 further comprising a spout attachable to the interchangeable housing at the enclosed top hole of the interchangeable housing.

6. The valve assembly of claim 1 further comprising a handle attachable to a side opening of the interchangeable housing.

7. A dispensing system having a side-mounted valve control comprising:
a valve enclosure comprising at least one outlet and at least one inlet,
an initial flow path axis substantially perpendicular to the at least one inlet; and
a ball valve mounted on a side perpendicular to the initial flow path axis comprising a ball having at least one inlet orifice, at least one outlet orifice and a stem, wherein the inlet orifice and the outlet orifice are configured to be perpendicular to at least a portion of the at least one outlet and at least one inlet, respectively, the side-mounted valve control connected to the stem to rotatably move the side-mounted ball valve within the valve enclosure such that when the ball is in an on position the at least one inlet orifice at least partially aligns with the at least one inlet, wherein the at least one outlet at least partially aligns with the at least one outlet orifice; and
an interchangeable housing configured to surround the valve enclosure.

8. The dispensing system of claim 7 further comprising a removable spout, wherein the removeable spout is in fluid communication with the at least one outlet.

* * * * *